United States Patent
Huang et al.

(10) Patent No.: US 10,066,976 B2
(45) Date of Patent: Sep. 4, 2018

(54) VORTEX FLOW METER WITH MICROMACHINED SENSING ELEMENTS

(71) Applicants: Liji Huang, Santa Clara, CA (US); Chih-Chang Chen, Cupertino, CA (US)

(72) Inventors: Liji Huang, Santa Clara, CA (US); Chih-Chang Chen, Cupertino, CA (US)

(73) Assignee: Wisenstech Ltd., Santa Clara, CA (US)

( * ) Notice: Subject to any disclaimer, the term of this patent is extended or adjusted under 35 U.S.C. 154(b) by 196 days.

(21) Appl. No.: 15/177,208

(22) Filed: Jun. 8, 2016

(65) Prior Publication Data

US 2017/0356772 A1    Dec. 14, 2017

(51) Int. Cl.
*G01F 1/32*    (2006.01)
*G01F 1/684*    (2006.01)

(52) U.S. Cl.
CPC .......... *G01F 1/3218* (2013.01); *G01F 1/6845* (2013.01)

(58) Field of Classification Search
CPC .......... G01F 1/6842; G01F 1/684; G01F 5/00; G01F 1/6845; G01F 1/68; G01F 1/3218; G01F 1/03
USPC ............................. 73/861.22, 202.5, 204.11
See application file for complete search history.

(56) References Cited

U.S. PATENT DOCUMENTS

| | | | | |
|---|---|---|---|---|
| 5,708,214 A * | 1/1998 | Kiguchi | ............ | G01F 1/3245 73/202 |
| 6,351,999 B1 * | 3/2002 | Maul | ............ | G01F 1/3209 356/439 |
| 6,851,311 B2 * | 2/2005 | Nakada | ............ | F02D 41/187 73/202.5 |
| 2005/0034535 A1 * | 2/2005 | Sprague | ............ | G01F 1/3209 73/861.22 |
| 2007/0017285 A1 * | 1/2007 | Wang | ............ | G01F 1/6845 73/204.26 |
| 2009/0049907 A1 * | 2/2009 | Wu | ............ | G01F 1/6845 73/204.26 |
| 2009/0158859 A1 * | 6/2009 | Huang | ............ | G01F 1/6845 73/861.351 |
| 2009/0164163 A1 * | 6/2009 | Wang | ............ | G01F 1/6845 702/100 |
| 2010/0116048 A1 * | 5/2010 | Fulkerson | ............ | A61M 1/3663 73/204.11 |
| 2010/0242589 A1 * | 9/2010 | Morino | ............ | G01F 1/6842 73/202.5 |

(Continued)

*Primary Examiner* — Eric S McCall
*Assistant Examiner* — Mohammed E Keramet-Amircola

(57) ABSTRACT

The design and structure of a vortex flow meter with large dynamic range utilizing a micro-machined thermal flow sensing device for simultaneously measurement of volumetric flowrate via vortex street frequency as well as mass flowrate is exhibited in this disclosure. The micro-machined thermal flow sensing device is placed at the central point of a channel inside the bluff body where the channel direction is not perpendicular to the direction of fluid flow in the conduit. The thermal flow sensing device is operating in a time-of-flight principle for acquiring the vortex street frequency such that any surface conditions of the device shall not have significant impact to the measured values. With a temperature thermistor on the same micro-machined thermal flow sensing device, the vortex flow meter shall be able to output the fluid temperature as well as the fluid pressure.

12 Claims, 8 Drawing Sheets

(56) References Cited

U.S. PATENT DOCUMENTS

| | | | |
|---|---|---|---|
| 2011/0030468 A1* | 2/2011 | Chen | G01F 1/6845 73/204.26 |
| 2012/0024054 A1* | 2/2012 | Huang | G01F 1/6845 73/204.26 |
| 2012/0216629 A1* | 8/2012 | Huang | G01F 1/7084 73/861.95 |
| 2013/0139608 A1* | 6/2013 | Gouwens | G01F 1/586 73/861.08 |
| 2014/0041460 A1* | 2/2014 | Bilgic | G01F 1/3209 73/861.24 |
| 2014/0116128 A1* | 5/2014 | Mantinband | G01F 1/6847 73/204.11 |
| 2014/0118161 A1* | 5/2014 | Jiang | H04Q 9/00 340/870.02 |
| 2014/0190251 A1* | 7/2014 | Huang | G01F 1/6888 73/204.24 |
| 2014/0283595 A1* | 9/2014 | Huang | G01F 1/699 73/204.17 |
| 2016/0238257 A1* | 8/2016 | Huang | F24C 3/126 |

* cited by examiner

VORTEX FLOW METER WITH MICROMACHINED SENSING ELEMENTS

BACKGROUND OF THE INVENTION

1. Field of the Invention

This invention generally relates to fluid flow measurement, and it particularly relates to a flow measurement apparatus that utilizes a bluff body to generate the vortex flow while a micro-machined flow sensing elements to measure both of the volumetric and mass flowrate of the flow media. This invention is further related to micro-machined thermal sensors or Micro Electra Mechanical Systems (MEMS) thermal flow sensing technology that can measure multiple parameters in a fluid flow apparatus.

2. Description of the Related Art

Vortex flow meters or vortex shedding street flow meters are one of the most commonly used flow measurement apparatus in industrial process monitoring, steam measurement and many other applications as they can be deployed for both liquid and gas flow media measurement and are simple to use at a relatively low cost. The operational principle for vortex flow meters although they can be in different configurations, is based on the phenomenon observed by Theodore von Karman in earlier twentieth century, which indicated that the frequency of vortex generated by a bluff body in the flow media shall be proportional to the media flow speed.

The current vortex flow meters in the arts are measuring speed or volumetric flowrate of a flow media, which are constituent with three major components packaged inside a flow conduit: a bluff body, a vortex frequency detecting sensor and signal process electronics. According to the disclosure by Rodel (A. E. Rodely, Bluff body flow meter, U.S. Pat. No. 3,572,117), the bluff body can be made into a variety of geometrical formality from which the vortex street would be generated. The geometrical shape of the bluff body is also related to the vortex detecting approaches. The most commonly used geometrical shape is triangular or trapezoid one placed at the middle of the flow meter conduit. Similarly there are many types of sensors that can be used to measure the vortex frequency, including thermal sensor (N. Matsubara, Explosive-proof high temperature compatible, multi-vortex flow meter, U.S. Pat. No. 7,861,602), piezoelectric element (M. Wada, M. Honda, and T. Andoh, Vortex flow meter, U.S. Pat. No. 6,480,812), pivoting strut (A. Konyukhov, and V. Bogdanov, Vortex flow meter with vortex oscillation sensor plate, U.S. Pat. No. 8,596,141), optical sensor (J. Maul, and F. Ohle, Vortex flow sensor, U.S. Pat. No. 6,351,999), and other sensors such as ultrasonic sensors, mechanical vibrational sensors and strain gauge sensors. The electronics of the meter shall be capable of effectively capturing the changes of the vortex frequency and correlating the changes in the measurement of the fluid flowrate.

Vortex flow meters however have some intrinsic issues at the real applications. For example, as the meters are measuring the vortex frequency, any external vibrational frequency could have potential interference to the meter measurement accuracy. Some current improvements have installed an additional inertial sensor (K. Gossner, Vortex flow meter having an inertial sensor for detecting parasitic oscillations, U.S. Pat. No. 8,820,176) for detecting external vibration interference, and to add deflection for avoiding electromagnetic radiation (A. Bilgic et al., Vortex flow meter, U.S. Patent Publication No. 2014/0041460). Theoretically, vortex shedding street can occur at a Reynold number of 2300, but practical vortex flow meter would not operate for Reynold number less than 10000. By adapting a micro-machined thermal mass flow sensor for the detecting of the vortex frequency, it was disclosed that due to the fast response time and high sensitivity, the detectable stable or linear vortex frequency can be at a lower Reynold number than those by other sensing approach (S. Kiguchi, Karman vortex flow meter, U.S. Pat. No. 5,708,214). However, even with such a sensing scheme by placing the micro-machined thermal mass flow sensor at a through channel symmetrically inside the bluff body and perpendicular to the fluid flow direction, the available products on market do not show an improvement but to a Reynold number of about 8000. As the vortex shall not be able to be generated at low flow, in order to extend the dynamic range of the vortex flow meter, a thermal mass flow sensing probe is used to combine with the vortex flow rate measurement such that lower flow rate can be measured with the single meter (K, Takahashi, Multi-vortex flowmeter employing mass flow rate or volume flow rate as switching point, European Patent No. 2,028,456). For the gaseous flow media, the volumetric flowrate measurement is often insufficient as the gas volume shall be significantly altered by the changes in flow media temperature and pressure, therefore it would be necessary to have addition temperature and pressure sensors installed inside the same fluid conduit for the desire data accuracy (E. C. Schmidt and J. D. Foster, Vortex flow meter with temperature compensation, U.S. Pat. No. 7,644,633; S. Oda, K. Takai, and K. Takahashi, Multi-vortex flowmeter integrating pressure gauge, U.S. Pat. No. 8,069,734). These improvements on the one hand increase the complexity of the metrology data process leading to a reduction of accuracy, on the other hand, they shall increase the manufacture cost and add the uncertainties for reliability. For example, use of thermal mass flow sensing and vortex sensing in a single meter in different flowrate detecting regime not only makes the switching point difficult to trigger as the flow conditions may vary during the operation, but the completely different measurement principles shall also not have the assurance a smooth transition of the acquired data.

For a vortex flow meter, in order to have a reproducible data acquisition, it is vital to exclude the nonlinear effects which limit the measurable dynamic range. Further, the design often requires stable vortex street from the vortex generator. Triangular or trapezoid generator is believed the best shapes for vortex street signal generation and is commonly applied in the design. In a triangular or trapezoid generator, many studies indicate that the front dimension or width of the triangular or trapezoid should be about 0.281 times of the diameter of the fluid conduit for a stable vortex generation. This chuck of materials at the fluid flow passage inside the fluid conduit shall result in a large pressure loss which in most cases are undesirable.

Steam measurement is one of the major applications for the vortex flow meter. However, due to the law pressure loss, it is difficult to calibrate the meter with air or gases but water or liquid. In addition, the steam may have different states such as saturated or unsaturated state which shall have different densities. Accurate measurement of steam flow is still pending for solutions as control of energy consumption has its increasing importance.

Therefore it is desired to have a vortex flow meter that shall be able to solve the above technical difficulties while utilizing the simplicity and existing advantageous features.

The critical ones shall have the desired vortex flow meter to measure the volumetric flowrate and mass flowrate simultaneously without adding addition sensing elements of pressure and temperature. The capability shall extend to the flow media density measurement such that the accuracy for flow media with variable densities can be significantly improved. It is also critical to have a large measurement dynamic range while reducing the pressure loss. To this objective, the present invention shall disclose a new vortex flow meter design that shall be able to measure the mass flowrate as well as the vortex volumetric flowrate using a single sensing element while having the capability of measurement the density of the fluid media. Such a design and configuration shall output high accurate and reliable metrology data as no additional sensing elements shall be required. The said vortex flow meter shall further reduce the pressure loss with the design of the reduced width dimension of the bluff body while maintaining the minimal required stable vortex frequency against the flowrate. The said vortex flow meter shall further be able to operate at a low power with capable of battery power supply and all state-of-the art electronics for data safety and networking.

SUMMARY OF THE INVENTION

It is the objective of the present disclosure to provide the design and structure of a vortex flow meter that can have a better performance in measurement dynamic range as well as have a capability for both of the volumetric and mass flowrate without additional pressure and temperature sensors. The said vortex flow meter shall have a bluff both placed at the center of conduit for the flow fluid. A micro-machined thermal mass flow sensor or an integrated mass flow sensor and time-of-flight sensor shall be placed in a vortex frequency detection channel inside the bluff body. The channel shall have a direction that has an angle less or more than 90 degree to the fluid flow direction in the conduit. This configuration shall result in a unsymmetrical pressure values at the two end of the channel which enables the flow media to alternatively pass through the channel due to the pressure differences at the two ends of the channel. Since the pressure values shall not be symmetry at the two ends of the channel inside the bluff body, and the channel direction is not perpendicular to the flow direction, the mass flow sensor placed inside the channel shall be able to measure the mass flow of the fluid while the frequency of the flow passing through the channel shall be proportional to the vortex frequency generated by the bluff body which can be further correlated to the volumetric flow of the flow media in the conduit at the calibration. Hence the single micro-machined flow sensor inside the channel of the bluff body shall be able to measure both the mass flowrate and volumetric flowrate. The said vortex flow meter shall have its signal conditioning and data process circuitry outside the fluid conduit and preferably at a distance for avoiding the contact of the electronics to the possible high fluid temperature such as in the case of steam flowrate measurement.

In one preferred embodiment, the disclosed vortex flowmeter with the micro-machined sensing elements shall utilize a trapezoid bluff body with a reduced size. The conventional bluff body used for generating the maximal vortex street can be made in trapezoid, for example. In the prior art, if a thermal sensor is to use for the detection of the vortex frequency, a channel that is perpendicular to the fluid flow direction was made inside the bluff body. A thermal flow sensor is placed inside the channel to measure the vortex frequency due to the differential pressure alternatively and symmetrically generated at the both side of the channel when the vortices generated by the fluid flow passing through the bluff body inside the fluid conduit. In this case, the thermal flow sensor inside the channel can only be mostly used to measure the frequency of the vortex street which can be further correlated to the fluid flowrate in the fluid flow conduit via a calibration. The dimension of the bluff body is normally set to be 0.281 of that of the fluid conduit diameter for a stable measurement. This configuration also leads to a large pressure loss which is also a character of the conventional vortex flow meter. The present disclosed configuration shall arrange the channel tilted at a non-perpendicular angle with respect to the fluid flow direction leading to an asymmetrical pressure values at the two entrances of the channel inside the trapezoid bluff body. This said design shall create an asymmetrical flow pattern from which mass flow information can be retrieved. The present disclosed configuration also allows a reduced bluff body dimension compared to that defined by the constraint of keeping the volume of the individual vortices a constant. Hence the present disclose shall have a desired smaller pressure loss in the fluid conduit.

In another preferred embodiment, the disclosed vortex flowmeter with the micro-machined sensing element shall be able to have an extended measurement dynamic range. For the current available state-of-the art vortex flow meters, measurement at the lower Reynold numbers is often non-linear that limited the measurement dynamic range. The lowest measurable flowrate is about 12000~20000 Reynold numbers with few reported capable meters starting at 8000 Reynold number whereas the theoretical limit for the onset of the vortices could be 2300 Reynold number. The present disclosure senses the asymmetrical differential pressure produced by the bluff body that generates a non-oscillating flowrate that is measurable even below the threshold of onset of the vortex street. The disclosure therefore not only can sense the lowest 2300 Reynold number but even lower ones that are non-vortex related flowrate can also be measured. With this said design, the dynamic range of the present disclosure is substantially larger than those available with the current technology.

In another preferred embodiment, the disclosed vortex flowmeter with the micro-machined sensing elements shall have the said sensing elements made in the formality of a flow sensor chip that is placed in the middle of the channel in the said bluff body. In order that the bluff body shall have a small form factor to accommodate the space for various fluid conduits, it is desired that the sensing elements shall be as small as possible. This is also to ensure the measurement sensitivity for the generation of the desired differential pressure across the channel as the differential pressure across the channel is inversely proportional to the channel diameter. In the present disclosure, the said micro-machined sensing elements are made on a millimeter dimension silicon or glass substrate with a thermal isolation cavity for better response and performance. The sensing elements are further made on a localized membrane on the said silicon substrate with a submillimeter size which defines the minimal channel size. In most of the cases, the present disclosure has the channel configured in the shape of a venture or trumpet such that it shall add the fluid flow stability at the center of the channel where the sensing elements are located.

In another preferred embodiment, the disclosed vortex flowmeter with the micro-machined sensing elements shall utilize the thermal flow sensing measurement principle. To achieve the desired performance, the desired thermal flow sensing elements shall be capable of acquiring multiple parameters from the flow fluids. For measurement of the vortex frequency through the alternation of the fluid flow inside the channel of the bluff body, it is desired in the present disclosure to utilize the thermal time-of-flight sensing elements. The time-of-flight is less sensitive to the flow instability and interferences of other factors such as fluid properties and in particular it is more sensitive to the lower flowrate responses. The additional pair of calorimetric sensing and thermal dissipative sensing elements integrated on the same micro-machined sensor chip shall be able to directly acquire the mass flowrate data and further relate to the fluid mass flowrate in the fluid conduit. In the prior art, the calorimetric sensing elements were not able to capture the mass flowrate but barely performed for the measurement of the vortex frequency. Compared to the present time-of-flight sensing, the calorimetric sensing is more prone to be alternated by the surface conditions of the sensing elements, such as the dust deposition on the sensing surface.

In another preferred embodiment the disclosed vortex flowmeter with the micro-machined sensing elements shall have a temperature sensing element integrated on the same sensing substrate such that the temperature sensor can be calibrated at the same time while the other thermistors on the silicon substrate are calibrated. The independent temperature sensor or thermistor shall measure the temperature of the fluid during the operation of the said vortex flow meter. As the vortex frequency shall meter the volumetric flowrate of the fluid in the conduit, the mass flowrate shall also be acquired is the thermal mass flow sensor in the asymmetrical channel. With the temperature value of the fluid, it shall enable the said vortex flow meta to derive the desired fluid pressure value without an additional pressure sensor.

In another preferred embodiment, the disclosed vortex flowmeter with the micro-machined sensing elements shall have the capability for derivation of the gas density from the acquired data. This capability is particularly nontrivial for the steam metrology. The current vortex flow meters often shall have large errors when measuring the steam flow as the density of the steam may vary during the delivery. Also the large pressure drop forced the calibration of the steam vortex flow meter via water instead of gas which shall also lead to large uncertainties as the densities for water and steam are quite different. In the present disclosure, the volumetric flowrate and mass flowrate shall be simultaneously acquired. The registers at calibration using clean and dry air for these IWO sets of data shall be used for the reference during the measurement. At the calibration conditions, the volumetric flowrate and mass flowrate are identical. The deviations of the volumetric flowrate and the mass flowrate values shall be due to the changes of the fluid density on condition that the composition of the fluid is kept the same which is the case in the steam flow metrology. Therefore by comparison of these two set of data acquired simultaneously, the density of the fluid can be obtained. This shall be crucial for the improvement of the fluid flow metrology accuracy when there would be a variation of the fluid density such as in the case for steam flow metrology.

In yet another preferred embodiment, the disclosed vortex flowmeter with the micro-machined sensing elements shall have a metal enclosure, preferred an all-purpose metal enclosure although for liquid fluid at ambient conditions the plastic enclosure shall provide the adequate protection for the said meter performance. A meter head is preferred to house the electronics for signal conditioning and data process as well as user interface or data communication. The meter head is further preferred to be placed at a distance via a metal structure such as a sealed pole. Such the said distance shall be necessary for flow metrology where the fluid has a high temperature such as in the case for steam metrology. The distance with certain temperature isolation materials shall allow the electronics always at their proper working conditions without being damaged by over temperature.

The present disclosure provides a new design of a vortex flow meter that can substantiate it from the conventional ones with significant larger dynamic measurement range, lower pressure loss, better resistance to contamination related failure as well as a simpler configuration with the capability of acquisition of volumetric flowrate and mass flowrate simultaneously. The said disclosure in particular can provide accurate metrology data for fluid with variable densities during the measurement, which provide a solution that has been desired for applications such as steam metering. These and other objectives of the present disclosure shall become readily apparent upon further review of the following drawings and specifications. And additionally for those with the knowledge of the art, the vortex flow meter could be further utilized for thermal energy measurement that would be the ultimate goals for thermal or water energy custody transfer.

BRIEF DESCRIPTIONS OF THE DRAWINGS

FIG. 1 is a direct measurement with the sensor being placed inside the bluff body while FIG. 2 utilized an elevated channel inside the bluff body.

DETAILED DESCRIPTION OF THE PREFERRED EMBODIMENTS

Figure 1:
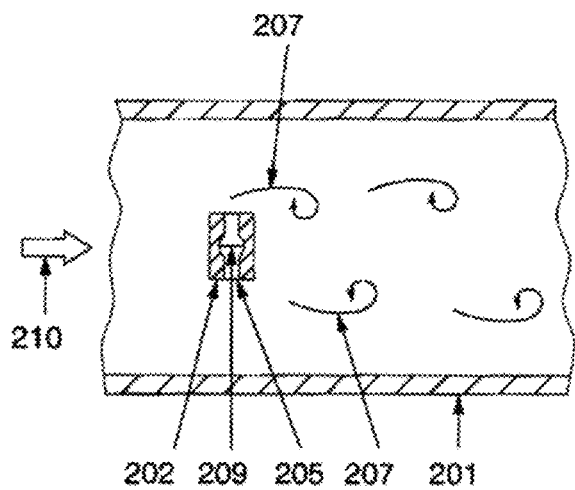
FIG. 1 is the vortex flow meter with a thermal mass flow sensor to measure the vortex frequency exhibited in the prior arts.
Figure 2:
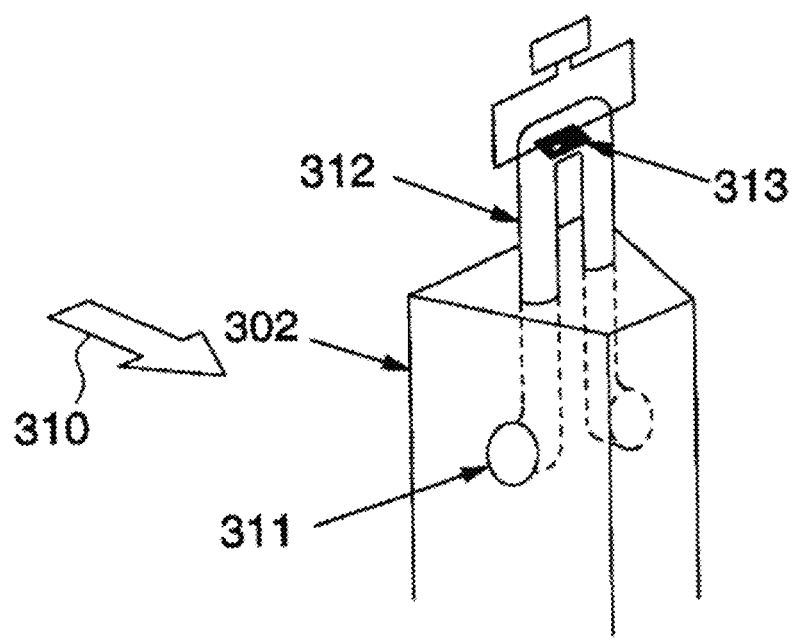

The two examples of utilizing thermal mass flow sensor to measure the vortex frequency are shown in FIG. 1 and FIG. 2 which are both from prior arts revealed by S. Kiguchi (Karman vortex flow meter, U.S. Pat. No. 5,708,214, Jan. 13, 1998) from some earlier unexamined Japanese patent publications. The conventional usage of the thermal mass flow for vortex frequency measurement was to place the sensor inside the bluff body in a channel perpendicular to the fluid flow direction. Although the traditional thermal mass flow sensor was normally a metal hot wire material which had a fast response time and it is excellent to meter the frequency generated by the vortex street, it is however easily got contaminated or damaged by the particles or other materials in the fluid which could adhere to the surface of the hot wire in the fluid, hence it suffers a reliability issue. The improvement of the art with an elevated passage as exhibited in FIG. 2 which shall be less prone to the contamination but the channel design had the problem to establish a stable differential pressure during the measurement which leads to large errors for the acquired data.

Figure 3:
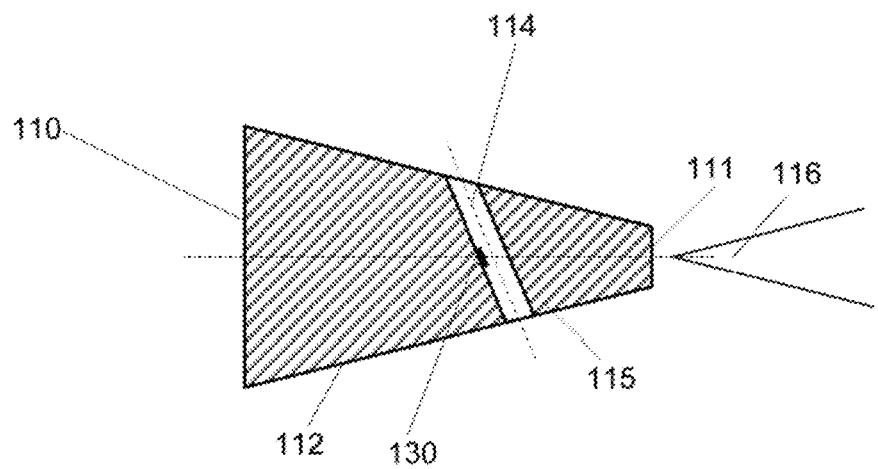
FIG. 3 is the detailed graphic presentation of the said bluff body with the asymmetrical channel where the two ends at the channel entrances shall have different pressure values creating a large pressure drop or differences.

For the preferred embodiment, the present disclosure of a new vortex flow meter design that utilizes a micro-machined integrated thermal flow sensor inside an asymmetrical channel of a trapezoid bluff body is show in FIG. 3. The design has two crucial improvements to the current state-of-the art vortex flow meters. On the one hand, the asymmetrical design enables a significant improvement of the sensitivity to the measurement of the difference pressure as the pressure point of at the two ends of the channel is asymmetrical and thus the difference shall be larger than that in the case of the perpendicular configuration, which contributes in particular for the improvement of the low flowrate metrology. On the other hand, the design of the asymmetrical or non-perpendicular channel to the fluid flow direction leads to the pressure values at the two ends of the channel shall be different. In this configuration, the differences shall drive the flow passing through the channel alternatively but not equally due to the vortex street generated by the bluff body. However, the vortex frequency shall not be affected by the configuration which shall be further correlated to the volumetric flowrate of the fluid flowing in the conduit where the bluff body is placed. The asymmetrical channel arrangement shall allow the mass flow data be collected by comparison with the flow from the two sides of the channel. With the temperature of the fluid being simultaneously measured by the flow sensor, the pressure of the fluid in the conduit can also be calculated. Thus the present design discloses a new vortex flow meter that can use a single thermal flow sensor to measure both volumetric flowrate and mass flowrate while the other metrology parameters for the flow fluid of interest can also be obtained without additional sensing elements such as individual pressure and temperature sensors.

Figure 4:
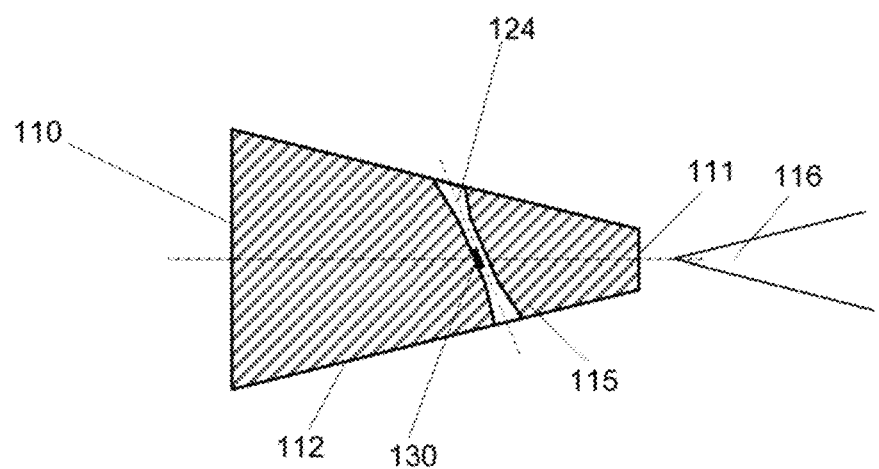
FIG. 4 is an improved embodiment where the channel is made into a venturi or trumpet structure for better flow stability and sensitivity at the central of the channel where the sensor being placed.

The bluff body front side dimension 110 is normally constrained by the fluid conduit diameter and the stable output requires that it is limited by 0.281 times of the fluid conduit diameter (D). This constrain in many cases contributes to the large pressure drop or loss for vortex flow meters. With the differential pressure channel 114 tilted, the effective length of the channel is also increased compared to the perpendicular one accounting from the pressure point of the larger distance from the bluff body front side. In the case that the angle 115 between the channel 114 and the sidewall of the bluff bode 112 is 90°, the present disclosure found that the front side dimension 110 can be reduced. Let the bluff body tail angle 116 be α, the front side dimension could be reduced to $0.281 \times D \times \cos(\alpha/2)$ to $0.281 \times D \times \cos(\alpha)$ without loss the reproducibility in the vortex street frequency measurement. This reduction shall reduce the pressure loss compared to those by the conventional vortex flow meters for a significant factor. As the measurement of the vortex frequency is from the channel inside the bluff body, this leaves a better freedom for the dimension of the parallel side 111 with respect to the front dimension 110. In the present disclosure, the integrated thermal flow sensor 130 is placed at the center of the pressure measurement channel 114. The channel size is also critical for the measurement sensitivity. A small one shall limit the low flow detection capability as the small differential pressure at low flowrate comparably to large pressure drop across the channel shall prevent fluid flow from traveling through while a large dimension shall generate flow instability resulting in inaccurate measurement. It is therefore an improvement to the embodiment exhibited in FIG. 3 is to configure the channel 124 into a venturi type as exhibited in FIG. 4. Further, the channel 124 may not be made with the exact dimensional constrains according to a venturi structure due to the size and space limitations, it is nonetheless that the dimension of the entrance of the channel shall be larger than that at the center where the flow sensor is placed such that the compression shall increase the flow stability and the acceleration of the flow speed that shall increase the sensitivity at the low flowrate for the flow sensor.

Figure 5:
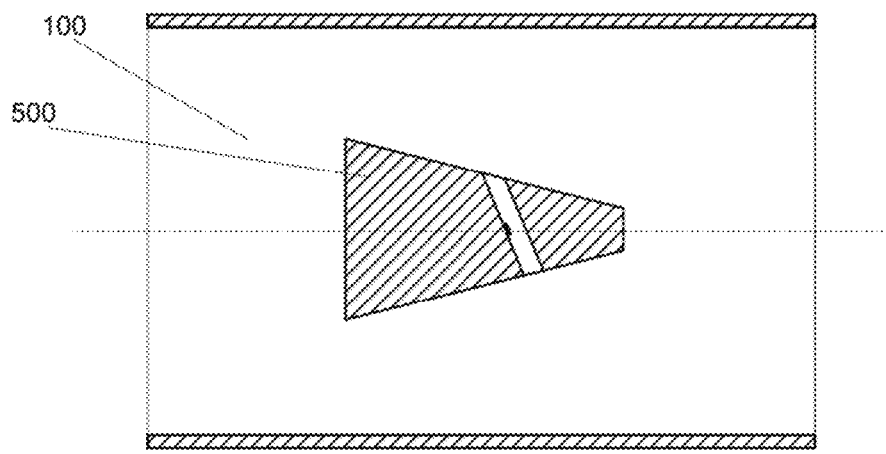
FIG. 5 and FIG. 6 show top and side view of the said bluff body placed inside the fluid conduit and the corresponding positions of the channel for vortex frequency acquisition as well as for the mass flow measurement.
Figure 6:
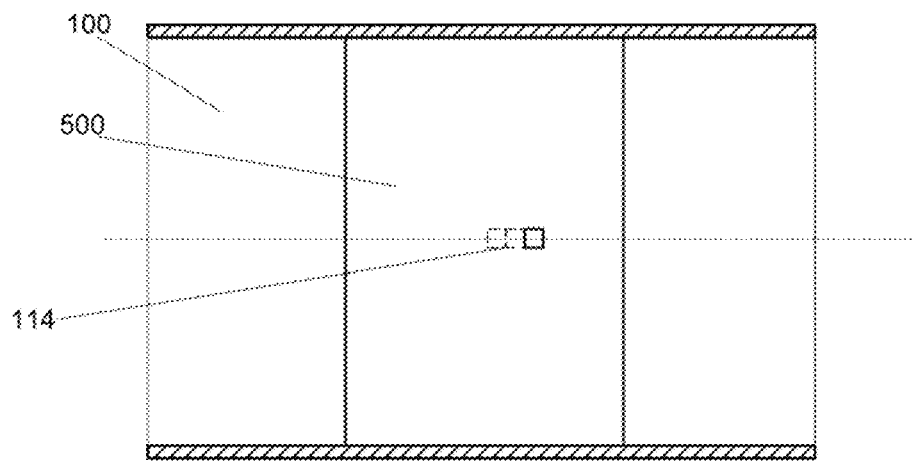

FIG. 5 and FIG. 6 exhibit the position of the bluff body 500 inside a fluid flow conduit 100, where FIG. 5 is a top view and FIG. 6 is a side view. In the preferred embodiment, the bluff body shall be placed at the middle of the fluid flow conduit, and it shall fill the conduit from top to bottom for the better vortex street stability. For the same reason, the channel 114 for measurement of the vortex frequency shall also be aligned to the center of the fluid flow conduit. This is in particular important for the low flowrate measurement as the profile of the flow in the conduit shall have the highest flowrate at the center of the conduit.

Figure 7:
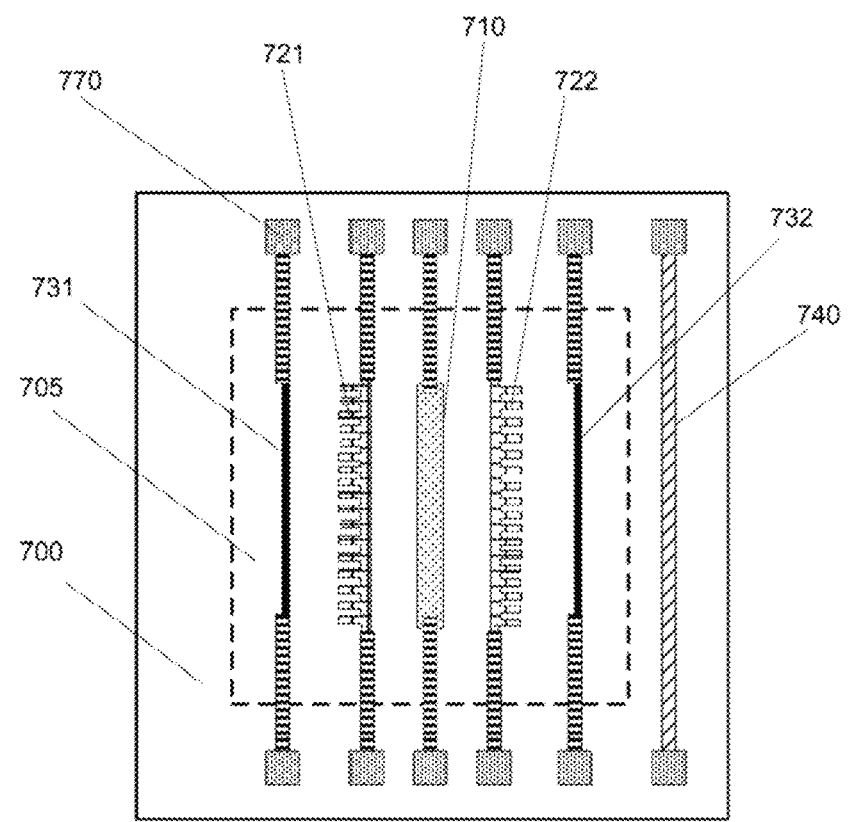
FIG. 7 is the preferred configuration of the said micro-machined flow sensor for the said vortex flow meter.

Thermal mass flow sensor has not been a conventional sensor for the vortex flow meters. Instead the pressure sensor placed at a distance to the tail of the bluff body is widely used. The main reason is the reliability of the thermal flow sensor. The traditional hot wire thermal flow sensor is prone to be fragile and even heavy vibration could result in damage. The late improved thermal sensors made on a substrate make it more robust but it could as well suffer from the surface contamination which shall make the data acquisition very unreliable. Therefore, it is the objective of the present disclosure to have the significantly improvement in the embodiment. FIG. 7 is the preferred micro-machined thermal flow sensor device that shall be utilized as the sensing elements for the disclosed vortex flow meter. The said device has the sensing elements deposited on a silicon substrate 700, or alternatively they can be deposited on a glass or ceramic or other solid state substrate. A thermal isolation membrane 705 can be made on the substrate for better thermal response. In the middle of the membrane it is the micro-heater 710, which provides the thermal source for the thermal sensing principles. A pair of thermistors, 721 and 722, shall be served as the calorimetric sensing elements which can measure the mass flowrate of the fluid via the measurement of the amplitude changes of the sensed heat variation due to the heat Migration carried by the fluid flow. The second pair of thermistors, 731 and 732, is a time-of-flight sensor that senses the thermal pulse or time of the heat carried away from the micro-heater to the sensing thermistor (s). This time lapse is directly proportional to the fluid flow speed. The time-of-flight sensors are used to measure the oscillation or frequency changes inside the channel that is corresponding to the vortex street frequency generated by the bluff body. The time-of-flight sensing is a frequency detection approach that is less prone to the changes in the surface conditions of the sensing chip. It is therefore more reliable in an environment where contamination is likely to be present. Use of a frequency measure instead of amplitude as it is in conventional approaches to meter the vortex frequency changes then effectively solves the current reliability issues for the thermal flow sensor applications in the vortex metering technology. The thermistor 740 is made on the substrate such that it has a better accuracy for measurement of the environment (fluid) temperature. The pads 770 that connect each thermistor can be distributed uniformly on two sides of the substrate or at one side which provide the interface for sensors to the signal conditioning and control electronics circuitry. The said complete thermal flow sensing device can then measure the volumetric flowrate, the mass flowrate as well as the temperature data acquired simultaneously via the single device, the pressure of the fluid is calculated based on the acquired data. Therefore, the present disclosure shall meter all of the desired metrology values with a single device.

Figure 8:
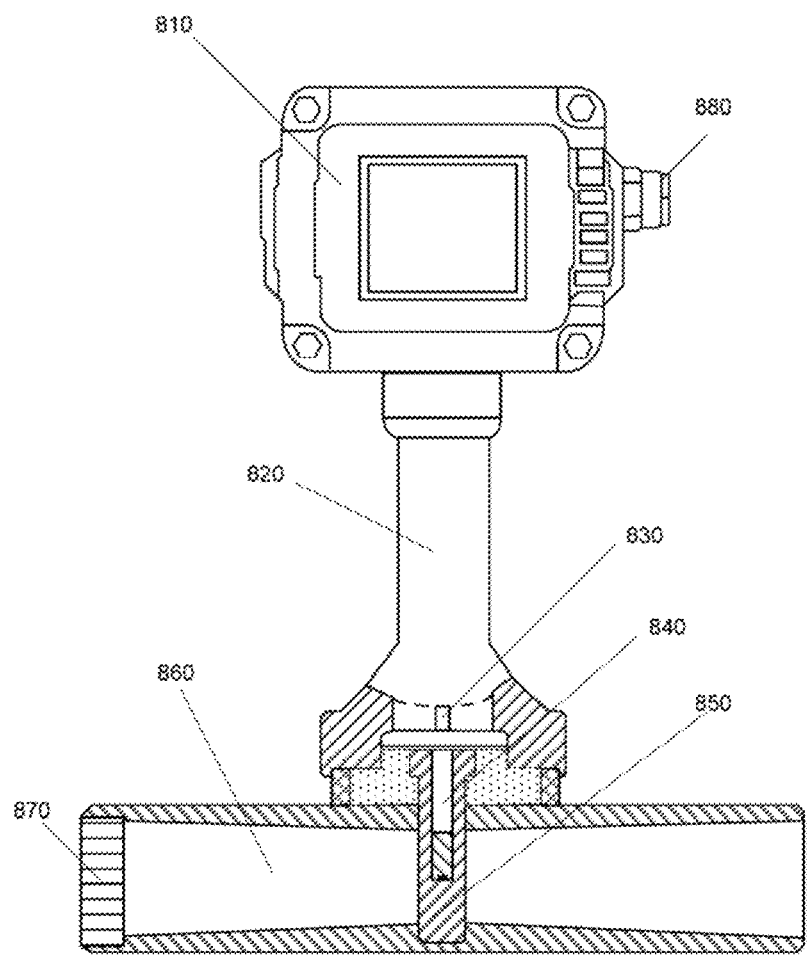
FIG. 8 is an example of the assembly of the said vortex flow meter.

For the preferred embodiments, the assembly of the said vortex flow meter is shown in FIG. 8. The meter head 810 shall house the signal conditioning and control electronics as well as the display of the said meter. The bluff body 850 is placed at the middle of the fluid conduit 860 which is made in a venturi structure that shall be effective for enhanced flow stability. A flow conditioner 870, preferably to be composed of a flow straightener and a flow profiler shall be installed at the entrance of the fluid conduit of the said vortex flow meter for assurance of the stable flow. The 820 shall be the connection support house for the cables that connect the sensors and the electronics. The size of 820 is preferred to be made in certain length that shall effectively isolate any high temperature fluid that the meter may measure, for example in case of steam metrology. The cable channel 830 and sensor interface cable house 840 are preferred to be made via metal for the protection as well as temperature isolation via high temperature materials such as high temperature polymer or epoxy. Finally the interface 880 shall provide the user access to the meter as well as communication port for networking or remote data management.

Figure 9:
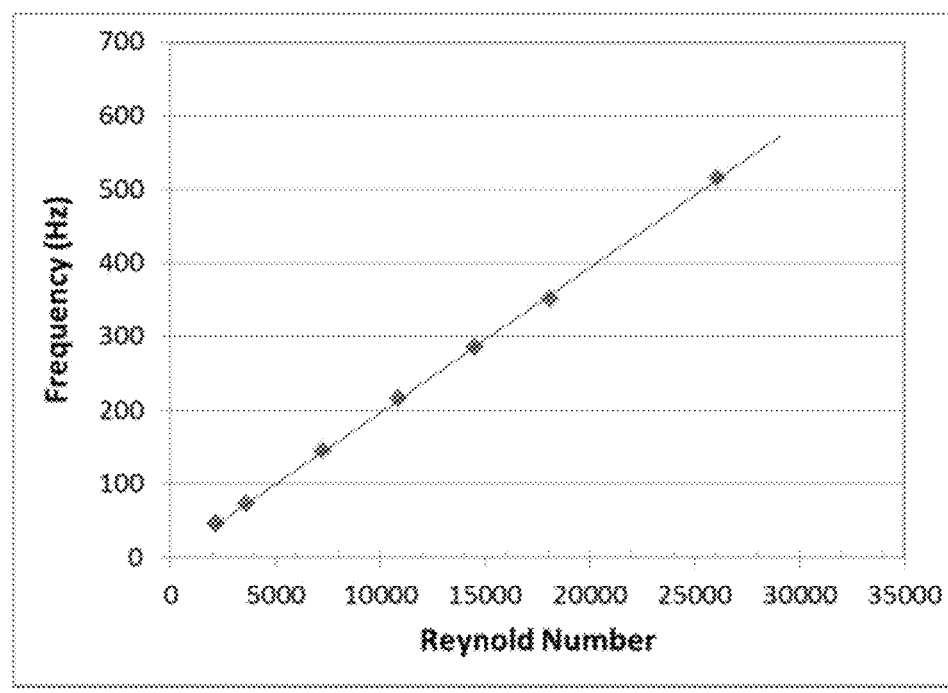
FIG. 9 and FIG. 10 are shown the actual data for both the volumetric flowrate and mass flowrate simultaneously acquired by the said vortex flow meter from the single micro-machined sensor placed in the channel inside the bluff body.
Figure 10:
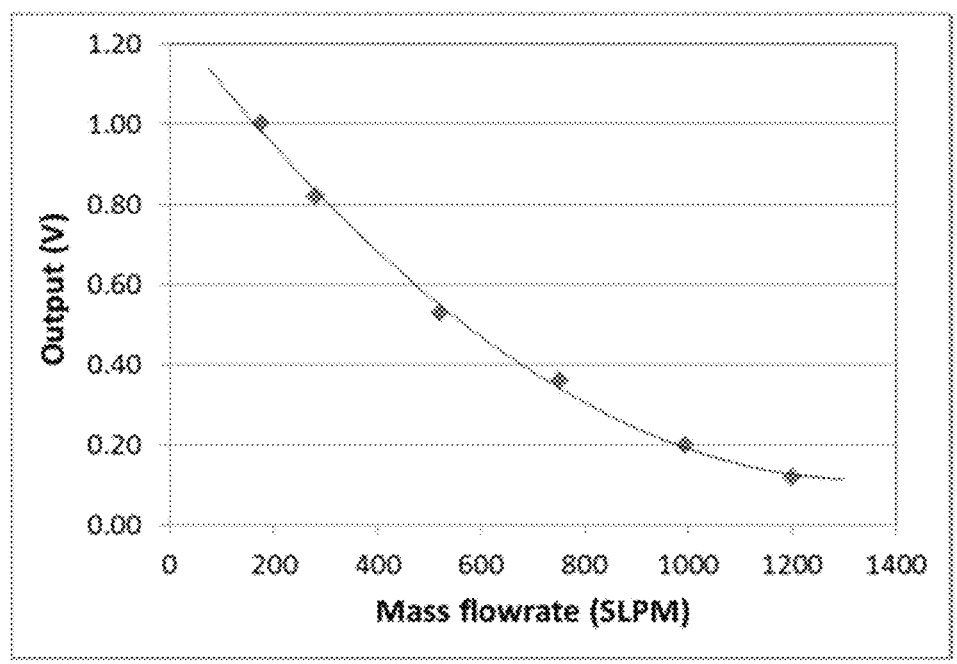

For the preferred embodiment, the data acquired from the said vortex flow meter are exhibited in FIG. 9 and FIG. 10. The volumetric flowrate are linear in an extended dynamic range starting from the onset of turbulence at the Reynold number of 2300 which is far lower than those by the current state-of-the art vortex flow meters where the lowest detecting limit is above 10000 Reynold number. The extended, range shall be critical in metering applications for custody transfer or tariff. The mass flowrate data (FIG. 10) from the same sensing element device can also be acquired at the same time. As the vortex frequency meters the volumetric flowrate of the fluid in the conduit, the mass flowrate can be acquired via the thermal mass flow sensor in the asymmetrical channel, this shall enable to derive the desired pressure data from the said vortex flow meter without additional pressure sensor. With the mass flowrate, $V_{mass}$, and volumetric flowrate, $V_{vol}$, and the acquired temperature value, T, the pressure of the fluid, P, can then be obtained by $$P = K \times T \times (V_{mass}/V_{vol}) \quad (1)$$

where the parameter $K = P_0/T_0$. And it is a constant obtained at the desired calibration fluid conditions ($P_0$, $T_0$). Therefore the present disclosure shall have the advantage of acquiring all flow metrology data with a single sensor device.

For the preferred embodiment, in case that the fluid media is identical but the density shall vary during the measurement even without the changes of the fluid pressure such as for the steam metrology where the steam can be in the form of saturated or non-saturated media. In such cases, the density measurement shall be critical for an acquisition of accurate metrology values which are however not available with the existing technology. In the present disclosure, as the sensor device used to measure the vortex frequency can also meter the mass flowrate. The said vortex meter for steam measurement with various densities could then be viable. During the calibration, the meter can register both the volumetric and mass flowrate and at the same pressure and temperature conditions. When the density changes while the temperature and pressure are kept the same, the metered volumetric and mass flowrate data shall then be deviated with which the compensation scheme shall be able to be applied based on the pre-set density values.

For the preferred embodiment, in case that a substantial contamination covers the sensor device surface, while the vortex frequency measurement shall not be impacted due to the time-of-flight signal frequency will not be eliminated but becomes weaker or stronger depending on whether the contamination materials is a thermal sensing value booster or a thermal value suppressor. The mass flowrate values however shall be substantially deviated from those by calibration register. The said vortex meter can then promote to an alarm status that alert the users to have the said vortex meter being placed for maintenance.

For the additional preferred embodiment, the said vortex flow meter for those in the art shall become readily and apparently could be further incorporated with additional features such as a gas composition sensor and the data shall be available for use for full spectrum metrology data analysis. It shall also be readily and apparently that the fluid applicable shall not be limited to the steam but also for those containing multiphase fluid flow media.

The invention claimed is:

1. A vortex flow meter incorporated with a micro-machined sensing device to have an extended dynamic range and low pressure drop comprising:

A fluid flow conduit enclosing a Venturi structure;

A bluff body in a form of trapezoid which is placed in middle of the fluid flow conduit of the vortex flow meter;

A detection channel which is built inside the bluff body and displaced non-perpendicularly and skewed with an angle to fluid flow direction;

A micro-machined silicon thermal flow sensing device which is located inside the detection channel and used for a purpose of measuring vortex street frequency as well as thermal mass flowrate of a fluid flow;

An additional micro-machined micro-thermistor which is integrated with the micro-machined thermal flow sensing device for temperature measurement of fluid flow;

A meter head housing which comprises components for functionalities of signal conditioning and data processing as well as user interface electronics and local display; and A complete enclosure which connects and houses aforementioned components to form a complete and stand-alone vortex flow meter system; wherein the enclosure meets safety requirements for industrial applications;

wherein the micro-machined flow sensing device inside the detection channel of bluff body is comprised two thermal flow sensors: one is thermal time-of-flight volumetric flow sensor and another one is calorimetric or anemometric thermal mass flow sensor; and wherein the thermal time-of-flight flow sensor is utilized for vortex street frequency measurement and the calorimetric or the anemometric mass flow sensor is utilized for mass flow rate measurement.

2. The vortex flow meter with extended dynamic range and low pressure loss of claim 1 wherein said bluff body is in the form of a trapezoid wherein front side dimension is from $0.281 \times D \times \cos(\alpha)$ to $0.281 \times D \times \cos(\alpha/2)$; D is fluid flow conduit diameter (D) and $\alpha$ is tail angle of the trapezoid; the preferred front side dimension is $0.281 \times D \times \cos(\alpha)$; the tail side dimension of the bluff body is $0.03 \times D \times \cos(\alpha)$ to $0.3 \times D \times \cos(\alpha)$; and the tail angle is preferably from 25 to 35°.

3. The vortex flow meter with extended dynamic range and low pressure loss of claim 1 wherein the detection channel for measurement of the vortex street frequency is made inside and in the middle of the bluff body; the detection channel is not perpendicular to the fluid flow direction but skewed with an angle; the angle with respect to the side of the bluff body preferably from 80 to 100°; the preferred far distance of the channel entrance to the front side of the bluff body $(\frac{1}{2}) \times D \times \cos(\alpha)$ to $(\frac{1}{3}) \times D \times \cos(\alpha)$.

4. The vortex flow meter with extended dynamic range and low pressure loss of claim 1 wherein shape of cross section of the detection channel for measurement of the vortex street frequency is made into a shape of circular or square, but preferably in a shape of square; the channel size is preferably from 1 to 5 mm in diameter; the channel is further preferably made into a venture shape or a trumpet shape.

5. The vortex flow meter with extended dynamic range and low pressure loss of claim 1 wherein the micro-machined thermal flow sensing device has two pairs of sensing elements; one pair is operating by the principle of thermal time-of-flight and is utilized to measure the frequency variations of the vortex street generated by the bluff body and from the fluid flow through the channel via the differential pressure differences across the channel; the other pair of the sensing elements is operating by principle of calorimetric sensing which is utilized to measure mass flowrate of the fluid flow through the channel and further correlated to the mass flowrate of fluid in the main fluid flow conduit.

6. The vortex flow meter with extended dynamic range and low pressure loss of claim 1 wherein the micro-machined thermal flow sensing device have an independent micro-thermistor integrated with the device for temperature measurement of the fluid flow.

7. The vortex flow meter with extended dynamic range and low pressure loss of claim 1 wherein the micro-machined thermal flow sensing device has capability to relay the data for processor and to calculate fluid pressure from the acquired volumetric flowrate, mass flowrate and temperature values of the fluid flow.

8. The vortex flow meter with extended dynamic range and low pressure loss of claim 1 wherein said micro-machined thermal flow sensing device is preferably installed channel wall and at central point of the detection channel inside the bluff body.

9. The vortex flow meter with extended dynamic range and low pressure loss of claim 1 wherein the meter head houses signal conditioning, data process, as well as user interface electronics; the meter head further have a local display that can display desired metrology information including volumetric flowrate, mass flowrate, temperature and pressure; if desired, the totalized flow also can be displayed.

10. The vortex flow meter with extended dynamic range and low pressure loss of claim 1 wherein the user interface contains software and hardware that can be locally accessed by onsite users and also have the networking capability as well as remote data access and data safety considerations.

11. The vortex flow meter with extended dynamic range and low pressure loss of claim 1 wherein said meter signal conditioning and data process electronics work at a low power mode and is able to be powered by battery, which is further in compliance with the industrial standard safety regulations.

12. The vortex flow meter with extended dynamic range and low pressure loss of claim 1 wherein said fluid flow conduit is made in the venturi structure having the bluff body placed at the middle of the fluid flow conduit; the fluid flow conduit further have installed a pair of flow conditioner including a flow straightener and a flow profiler at the entrance of the fluid flow conduit.

* * * * *